United States Patent [19]

Paar et al.

[11] Patent Number: 4,565,838
[45] Date of Patent: Jan. 21, 1986

[54] CATHODICALLY DEPOSITABLE ELECTRODEPOSITION PAINT BINDERS BASED ON EPOXY RESIN-AMINO ADDUCTS REACTED WITH PHENOL AND FORMALDEHYDE MODIFIED WITH AN UNSATURATED, SUBSTANTIALLY WATER-INSOLUBLE COMPONENT

[75] Inventors: Willibald Paar; Wolfgang Daimer, both of Graz, Austria

[73] Assignee: Vianova Kunstharz, A.G., Werndorf, Austria

[21] Appl. No.: 712,540

[22] Filed: Mar. 18, 1985

[30] Foreign Application Priority Data

Oct. 1, 1984 [AT] Austria ............................ 3096/84

[51] Int. Cl.$^4$ ...................... C08G 18/80; C08G 59/14; C09D 3/58; C09D 5/44
[52] U.S. Cl. .................................. 523/414; 523/416; 523/417; 524/901
[58] Field of Search .................. 523/414, 416, 417; 524/901

[56] References Cited

U.S. PATENT DOCUMENTS

| | | | |
|---|---|---|---|
| Re. 31,616 | 6/1984 | Tsou | 523/414 |
| 4,172,193 | 10/1979 | Marx et al. | 524/901 |
| 4,197,224 | 4/1980 | Schmölzer et al. | 524/901 |
| 4,278,579 | 7/1981 | Murphy | 524/901 |
| 4,278,580 | 7/1981 | Schmölzer et al. | 524/901 |

Primary Examiner—Ronald W. Griffin
Attorney, Agent, or Firm—A. W. Breiner

[57] ABSTRACT

Cathodically depositable electrodeposition paint binders comprising a mixture of (A) 95–50% by weight of the reaction product of an epoxy resin with at least two epoxy groups with amines carrying primary amino groups and, optionally, with a carboxylic acid compound to provide an epoxy resin-amino adduct which is then reacted with a phenol and formaldehyde; and (B) 5–50% by weight of an addition component which is substantially water-insoluble under the conditions of electrodeposition and being compatible with Component A. The presence of Component B in the binder provides increased resistance to corrosion, improvements in the surface quality of the stoved films, and enhanced crosslinking of the binder.

29 Claims, No Drawings

CATHODICALLY DEPOSITABLE ELECTRODEPOSITION PAINT BINDERS BASED ON EPOXY RESIN-AMINO ADDUCTS REACTED WITH PHENOL AND FORMALDEHYDE MODIFIED WITH AN UNSATURATED, SUBSTANTIALLY WATER-INSOLUBLE COMPONENT

FIELD OF INVENTION

The present invention relates to cathodically depositable electrodeposition paint binders which are self-crosslinking based on the reaction product of epoxy resin-amino adducts with formaldehyde and phenols modified with unsaturated compounds substantially water-insoluble under the process conditions of electrodeposition.

BACKGROUND OF INVENTION

Cathodically depositable electrodeposition paint binders comprising the reaction product of an epoxy resin with at least two epoxy groups and an epoxy equivalent weight of from about 180 to 1000, with amines carrying primary amino groups and, optionally, with a carboxylic acid compound to provide an epoxy resin-amino adduct which is then reacted with a phenol and formaldehyde are described in a concurrently filed application entitled "Cathodically Depositable Electrodeposition Paint Binders Based on Reaction Products of Epoxy Resin-Amino Adduct With Formaldehyde and Phenols," commonly assigned to the assignee of the present application. Coating compositions prepared in appropriate manner from the binders produced according to the aforesaid concurrently filed application exhibit excellent performance on electrodeposition and outstanding stability of the bath material. The theoretical explanation of the excellent performance is based on the resistance to hydrolysis of the molecule formed through direct linkage between epoxy resin, amine, and phenol. The products, at stoving temperatures as low as 150° C., yield films with excellent corrosion resistance, even without coemployment of catalysts. The quantity of decomposition products split off on stoving is low, with such products consisting substantially of water and formaldehyde in minor amounts.

OBJECTS AND GENERAL DESCRIPTION OF INVENTION

It has now been found that the properties of the binders described in the aforesaid concurrently filed application can be advantageously modified and adjusted to meet particular requirements through reaction with specifically selected unsaturated compounds which are practically water-insoluble under the process conditions of electrodeposition and which are compatible with the base resin.

Accordingly, the present invention is directed to a process for producing cathodically depositable electrodeposition paint binders based on modified epoxy resins, characterized in that-
- (A) 95 to 50% by weight, preferably 90 to 70% by weight calculated on solids content of a reaction product obtained through reaction at 50° to 120° C. of an epoxy resin having at least two epoxy groups and an epoxy equivalent weight of 180 to 1000 with-
    - 0.6 to 1.0 moles of primary amino groups per each available epoxy group, the primary amino group being from a primary monoalkyl amine and/or a primary alkylene diamine and/or a primary-tertiary alkylene diamine, and
    - 0 to 0.4 moles of a carboxylic compound or a secondary amine per available epoxy group
  to provide an epoxy resin-amino adduct having an epoxy value of practically zero, the resulting epoxy resin-amino adduct then being reacted at from about 50° to 90° C., calculated on one mole of NH-groups, with
    - 0.5 to 1.0 moles of a mono- or polynuclear phenol and/or alkyl phenol and/or amino-alkylation product of a monosubstituted mono- or dinuclear phenol, or, optionally, substituted in part with a formaldehyde-reactive compound such as urea, melamine or guanamine, and with
    - 0.25 to 0.9, preferably 0.6 to 0.8, moles of formaldehyde per formaldehyde-reactive site, until the formaldehyde is substantially bound and the reaction product, upon partial or total neutralization with acids and, optionally after addition of water-tolerant organic solvents, is dilutable with water;

is mixed with
- (B) 5 to 50% by weight, preferably 10 to 30% by weight, calculated on solids content, of an addition component, substantially water-insoluble under the conditions of electrodeposition and compatible with Component A, said addition component being selected from the group consisting of
    - (a) drying oils with an iodine number of above 120, synthetic esters of the fatty acids contained in such oils or of tall oil fatty acids, with polyols, and optionally pre-polymerized forms of the aforementioned compounds,
    - (b) addition products of maleic anhydride to hydroxy-free compounds of the type mentioned under (a) or to unsaturated hydrocarbon oligomers, polymers, or copolymers with a molecular weight of from 400 to 3000, the carboxy or anhydride groups of which have been practically completely transformed to ester, amide, or imide groups, and
    - (c) compounds carrying at least 2 (meth)acrylic or allyl double bonds, the mixture, after being transformed to the water-dilutable salt by partial neutralization of the basic groups with inorganic and/or organic acids and, optionally with partial elimination of the organic solvent, being dilutable with water.

In using the addition component as defined for combination with the base resins (Component A), according to the present invention, surprisingly it has been found that besides obtaining an improvement in the formation of the coating on electrodeposition and of the surface quality of the stoved films, crosslinking of the binder is also enhanced. It is theorized that on stoving reactions occur between the resol groups of the base resin and the unsaturated reaction component, presumably between alkyl phenol resols and unsaturated oils according to Hultzsch (formation of chromane rings) or Van der Meer (linking of chains) as defined in H. Wagner and H. F. Sarx, "Lackkunstharze," C. Hanser, Munich, Germany, 1971. The advantages of the products obtainable when using the base resins alone, such as ease of production, excellent bath stability and low extent of decomposition losses on stoving, are not adversely influenced by mixing with Component B, or to a minor degree only.

Suitable epoxy resins for carrying out the invention are commercially available di- or polyepoxy compounds obtained through reaction of polyvalent phenols, particularly of bisphenol A, or of phenol novolaks with epichlorohydrin. Optionally, other epoxy resins, for example resins based on polyols, may be used. Products of this type are disclosed in the literature and are known to those skilled in the art. The epoxy resins preferred for the process of the invention are based on bisphenol A or on phenol novolaks with an epoxy equivalent weight of from about 180 to 1000.

In carrying out this invention, the epoxy resins, preferably in the presence of aprotic solvents, are reacted with a primary amine to give an epoxy resin-amino adduct carrying secondary amino groups. For each available epoxy group on the epoxy resin, 0.6 to 1.0 moles of primary amino groups are used, the amino groups being from primary monoalkylamines preferably having four or more carbon atoms in the alkyl radical, or primary alkylene diamines or diamines carrying a tertiary amino group besides the primary amino group, such as a dialkyl amino group. The preferred representatives of this group are n- and isobutyl amine, hexyl amines, 2-ethylhexylamine, ethylene diamine, and its homologues; and primary-tertiary diamines such as dimethylaminopropylamine, diethylaminopropylamine, and the homologues of this series. Mixtures of alkylamines and alkylenediamines are particularly preferred. The reaction is carried out at from about 50° to 90° C.

The aprotic solvents useful in various cases for carrying out the reaction are aromatic hydrocarbons such as toluol or xylol or glycoldiethers, such as diethyleneglycoldimethylether. The quantity of solvents which can be used range from about 10 to 50%, calculated on the epoxy resin-amino adduct.

Optionally, the epoxy resin-amino adduct may be modified with up to 40 mole-%, calculated on the available epoxy groups, with carboxylic compounds, such as the saturated or unsaturated fatty acids, carboxy group containing polyesters or corresponding pre-polymers, such as polymers based on the acrylates. The preferred fatty acids are monocarboxylic acids having from 7 to 20 carbon atoms of synthetic or natural origin. Examples are iso-octanoic acid, iso-nonanoic acid, alpha-branched synthetic monocarboxylic acids with $C_8$–$C_{12}$-alkyl radicals (KOCH-acids) or oil fatty acids and tall oil fatty acids. Other monocarboxylic compounds suitable for the modification of the epoxy resin-amino adducts are semi-esters of dicarboxylic acids with monoalcohols with more than three carbon atoms, or carboxylic acids modified with oxazolidines. The preparation of the latter is disclosed in commonly assigned U.S. application Ser. No. 06/549,328 filed Nov. 7, 1983. There the oxazolidines serve as additional donator of formaldehyde. The reaction with the carboxy group containing modifiers is preferably carried out at from about 90° to 120° C. prior to the reaction with the amines.

In a special embodiment of the present invention, the carboxylic compounds coemployed with the primary amino compound and which can be used to particular advantage are adducts of maleic acid anhydride to unsaturated oils and/or unsaturated hydrocarbon compounds, the anhydride groups of which have been opened through formation of semiesters with monohydroxy compounds, the free carboxy groups being optionally partially reacted with monoepoxy compounds. Through this modification the film surface and the flexibility of the films can be essentially improved. The maleic acid anhydride adducts suitable for the modification of the epoxy resin-amino adduct are formed in known manner through addition of maleic anhydride to unsaturated oils such as tung oil, linseed oil, dehydrated castor oil, soya oil, sunflower oil, and similar natural oils. Synthetic hydroxy-free esters of the fatty acids contained in the aforementioned oils and of tall oil fatty acids with polyols also are suitable starting materials. The preferred polyene compounds for reaction with maleic anhydride are unsaturated low-molecular hydrocarbon polymers or oligomers. Examples of this class of compounds are the so-called polybutadiene oils, i.e., liquid oligomers of butadiene with various stereospecific structures, or the corresponding pentadienes or cyclopentadienes. These compounds normally have molecular weights of between 400 and 3000. It is evident that blends of these starting materials can be used in the adduct formation with maleic anhydride. The quantity of maleic anhydride is chosen in order that the carboxylic compound has an acid value of from about 30 to 130 mg KOH/g, preferably from about 35 to 80 mg KOH/g. For semiester formation, the maleic anhydride adducts are reacted with the monohydroxy compounds in known manner at from about 50° to 150° C. Suitable monohydroxy compounds are the saturated or unsaturated monoalcohols with from 1 to 18 carbon atoms, such as methanol and its homologues, fat alcohols, allyl alcohol, etc. Other suitable monohydroxy compounds are glycol monoesters of (meth)acrylic acid, such as hydroxyethyl(meth)acrylate, hyroxypropyl(meth)acrylate, and the further homologue and isomeric compounds. When using unsaturated monohydroxy compounds, it is advantageous to carry out the reaction in the presence of inhibitors, such as hydroquinone. The number of carboxy groups on the semiesters can be reduced by the reaction of such groups with monoepoxy compounds, such as esters of epoxidized fatty acids or glycidyl esters or ethers. Examples of compounds suitable for this purpose are glycidyl esters of KOCH-acids, defined above, particularly those carrying at the tertiary carbon atom at least one fatty acid radical with more than eight carbon atoms. The reaction of this group of carboxylic compounds with the epoxy groups of the epoxy resin is carried out at from about 90° to 150° C. It is of advantage to carry the reaction to the complete linking of the modifying compound.

Suitable further modifiers are secondary amines, particularly secondary alkyl amines. The tertiary amino groups resulting can influence the solubility of the products.

The reaction step leading to the epoxy resin-amino adduct is carried to an epoxy value of practically zero, i.e., the obtained epoxy resin-amino adducts are free from epoxy groups.

The resulting epoxy resin-amino adduct, optionally modified with carboxylic compounds, is reacted with formaldehyde or a compound which will split off formaldehyde under the reaction conditions along with a mono- or polynuclear phenol and/or alkyl phenol and/or an amino-alkylation product of monosubstituted mono- or divalent phenols or, optionally, substituted in part with a formaldehyde-reactive compound of the urea, melamine, or guanamine type. According to the invention, for each mole of NH-groups in the epoxy resin-amino adduct, 0.5 to 1.0 moles of phenol and, for each formaldehyde-reactive site, 0.25 to 0.9 moles of formaldehyde are reacted. The reaction is carried out at from about 50° to 90° C., and is preferably carried out to obtain substantially complete linking of the formaldehyde.

Phenol, as the phenolic component, is used in the forms commonly found on the market, such as 90% liquid phenol or alkyl phenols such as the methyl, butyl, or higher phenols such as nonyl phenols or diphenols of the formula Ph—R—Ph, wherein R is a straight chain or branched alkylene radical with from 1 to 5 carbon atoms and where Ph is a phenol moiety, preferably bisphenol A. The phenols have to have at least two formaldehyde-reactive sites to achieve the desired properties.

In an alternative of the process which permits the reduction of the quantity of acid necessary for achieving adequate water solubility, the phenol component of this invention can be totally or partly an amino-alkylation product of monosubstituted mono- or dinuclear phenols, the substituent being an alkyl radical with at least four carbon atoms or an aralkyl radical, and the amine has at least two amino-hydrogen atoms and at least four carbon atoms. As a result of these structures, besides improved solubility, additional flexibilizing and flow-out enhancing groups are introduced into the binder molecule. Accordingly, the coemployment of high boiling solvents in the paint formulation is eliminated, or the solvents are necessary in only low levels. The amino-alkylation phenol products used in this embodiment are formed in the pattern of a Mannich-reaction from phenols, amines, and formaldehyde. In contrast to the cathodically depositable binders based on Mannich-bases, as disclosed in the prior art, the Mannich-reaction in this case is only an additional modification of the phenolic component. As a result of using the primary and higher molecular amines, the quantity of decomposition products forming on stoving is increased through this modification in subordinate rate only.

For the preparation of the amino-alkylation phenol intermediates used according to the invention, the suitable monosubstituted mononuclear phenols are, in the first place, alkyl phenols, the alkyl radical of which carries at least four carbon atoms. Representatives of this group are butyl phenols and their higher homologues, preferably those with eight and more carbon atoms in the substituent, such as p-isooctylphenol or p-nonylphenol. Other suitable substituents are aralkyl radicals of the type present in benzyl phenol or cumyl phenol. In the group of dinuclear phenols bis-hydroxyarylalkanes, such as bis-(4-hydroxyphenyl)methane or, preferably, 2,2,-bis-(4-hydroxyphenyl)propane (bisphenol A) are illustrative examples.

Suitable amines for use in forming the intermediate components are those carrying in the molecule at least two amino-hydrogen atoms and having at least four carbon atoms. Among these compounds are primary (alkanol)amines, such as the butyl amines, their higher homologues, such as ethylhexylamine, the corresponding alkanol amines, the corresponding primary diamines, such as hexamethylene diamine, or primary-tertiary diamines, such as N,N-diethylaminopropylamine. Suitable amines may also be formed through reaction of primary diamines (1 mole) with acrylic esters or monoepoxy compounds (2 moles). Particularly suitable compounds are reaction products of hexamethylene diamine with butyl acrylate and 2-ethylhexylacrylate or with glycidyl esters of KOCH-acids as above defined.

The amino-alkylation phenol intermediate components suitable for the process of the present invention are prepared in order that the amines are heated together with the phenols to 70° to 80° C. After addition of formaldehyde, preferably as paraformaldehyde, the reaction is carried on at 80° to 130° C., the reaction water being eliminated with the aid of an entraining agent. Depending on the type of the reactants, the reaction may become less or more exothermic on the addition of formaldehyde. The reaction is finished when one mole of reaction water has been entrained for each mole of phenol used.

Products with substantially equal properties are obtained in an alternative method whereby the amino-alkylation of the phenols is carried out in the presence of the epoxy resin-amino adduct. This alternative allows the production of the products of the invention in a "one-reactor process." After producing the epoxy resin-amino adduct, the amine provided for alkylation, the phenol, and the formaldehyde are added and condensed for one to three hours at 70° to 90° C. The reaction water forming remains in the reactor. After this reaction time, the selected quantities of phenol and formaldehyde are added, and the reaction is carried at from about 55° to 80° C. to a formaldehyde content of below 0.5% (Alternative B hereinafter).

In a further alternative (Alternative C hereinafter), it is possible to combine both reaction steps. In this method the epoxy resin-amino adduct is jointly mixed with the amine component and the total quantity of phenol and the total quantity of formaldehyde, and the reaction is carried out at 60° to 75° C. until the formaldehyde has reacted.

Optionally, the mono- or polyvalent phenol and/or alkyl phenol used according to this invention may be partly replaced by other formaldehyde-reactive compounds. Thus, the phenols can be partly replaced by amino compounds of the urea, thiourea, melamine or guanamine type, imparting a further improvement of the solubility characteristics. This latter alternative is characterized in that 0.1 to 0.4 moles of the phenolic compound are replaced by formaldehyde-reactive amino compounds of the urea, thiourea, imidourea, melamine, acetoguanamine type, or mixtures of such compounds, and are reacted in a joint reaction step with the secondary amino group containing amino compound and formaldehyde. By this measure not only are the solubility characteristics improved, but also the adhesion of the deposited film to the substrate as well as to the following coat is enhanced. The group of formaldehyde-reactive compounds useful in the present invention in particular embraces compounds of the urea, thiourea, iminourea, melamine, aceto- and benzoguanamine type, or mixtures of these compounds. The phenolic compounds can be replaced by the mentioned amino compounds at a level of from 0.1 to 0.4 moles of the phenols.

Formaldehyde, as above noted, is preferably used as paraformaldehyde in one of the marketed forms, with a content of formaldehyde of from 80 to 100%. In addition, compounds can be used as formaldehyde donators which split off formaldehyde under the reaction conditions. Such compounds include oxazolidine compounds which are used in the form of their carboxylic derivatives or as amines to modify the epoxy resin. Formaldehyde is used in a molar quantity corresponding to 25 to 90, preferably 30 to 80 mole-% or, in the particularly preferred embodiment, in a quantity of from 60 to 80 mole-%, calculated on the formaldehyde-reactive sites of the phenolic component. In order to obtain a self-crosslinking structure, it is of advantage to employ a molar excess of at least 30% of formaldehyde over the NH-groups.

Unsaturated compounds, Component B as above described, suitable for reaction with the base resins (Component A) are selected from the following groups:

(1) Drying oils with an iodine number of over 120, such as tung oil, oiticica oil, linseed oil, dehydrated castor oil; synthetic esters of the fatty acids contained in these oils or of tall oil fatty acids, with polyols. Optionally, the oils or esters can be used in a prepolymerized form.

(2) Addition products of maleic acid (anhydride) to the hydroxy-free esters of the above-mentioned materials of group (1) or to unsaturated hydrocarbon oligomers, polymers or copolymers with a molecular weight of from 400 to 3000, the carboxy or anhydride groups of the maleic acid or anhydride having been transformed to ester, amide, or imide groups. Suitable unsaturated hydrocarbon compounds, preferably, are liquid oligomers of butadiene with various stereospecific structures, or the corresponding pentadienes or cyclopentadienes. The esterification, in the case of anhydrides, is, in the first step, preferably, the semiester formation with monoalcohols or glycol monoethers. The carboxy groups are esterified in known manner with monoepoxy compounds. A preferred group of monoepoxy compounds for esterification of the carboxy groups of the adducts are the glycidyl esters of $C_9$–$C_{11}$-fatty acids with tertiary carboxy groups (KOCH-acids).

(3) Compounds carrying at least two acrylic double bonds. Such bonds are present in the esters of (meth)acrylic acid with alkane diols, preferably those with four or more carbon atoms, polyalkylene glycols or diepoxy resins, or with polyols, such as trimethylol propane or pentaerythritol. These groups can be introduced through reaction with unsaturated monoisocyanates, such as the isocyanato-alkyl(meth)acrylates or reaction products of equimolar quantities of diisocyanates and hydroxy(meth)acrylates into hydroxy compounds or polyesters carrying hydroxy groups. Also the polyallylethers of polyols, such as trimethylolpropane diallylester are unsaturated compounds of this type. It is evident that mixtures of the various types of unsaturated compounds can be used.

An essential property of the unsaturated compounds for use according to the present invention is their substantial insolubility in water under the conditions of the cathodic electrodeposition (CED) process. This is also true for products which contain basic groups in any form. On the other hand, Component B materials have to be compatible with the base resin, i.e., the combinations of base resin Component A and Component B have to yield substantially non-opaque films when applied as a clear varnish. The compatibility of combination partners, if not initially present, can in many cases be achieved by a partial reaction of the water-insoluble unsaturated compound with the base resin.

In preparing an electrodeposition (ED) bath, 95 to 50% by weight, calculated on resin solids, of Component A are homogeneously mixed with 5 to 50% by weight, calculated on resin solids, of Component B, optionally with slight warming. The combinations preferably contain 10 to 30% by weight of Component B. Optionally, the viscosity of the partners or of the mixture can be reduced further by use of an auxiliary organic solvent, such as glycol ethers.

The mixture of the resins is jointly neutralized with inorganic and/or organic acids, preferably formic acid, acetic acid or lactic acid, and thus rendered water-soluble. In order to obtain a stable ED-bath, normally a degree of neutralization of 10 to 40%, corresponding to a quantity of neutralizing agent of about 20 to 60 milli-Moles acid for 100 g base resin (solids). The binders are further diluted to the desired concentration with deionized water. Optionally, prior to neutralization, or in only partially neutralized form, the binders are further processed to pigmented paints with pigments, extenders and other additives, preferably in the form of pigmented pastes. Optionally, the auxiliary solvents not water-dilutable can be partly vacuum-stripped at 30° to 80° C. during or after (partial) dilution with water. In this manner products are obtained which contain only low amounts of solvents, complying with polution regulations of various countries. The formulation of the paints and their processing in the ED-process are known to those skilled in the art and are described in literature. When used as primers, the deposited coatings are cured at from 150° to 200° C. for 10 to 30 minutes. For the lower range of curing temperatures, it is advantageous to add cobalt or manganese salts used as siccatives.

If the binders do not carry a sufficient level of self-crosslinking structures, additional crosslinkers can be added, such as blocked isocyanates or amine resins and phenolic resins. With adequate formulation, the products may also be applied by other methods, such as dipping, roller coating, or spraying. Optionally, the binders may be processed with organic solvents.

DETAILED DESCRIPTION AND EXAMPLES OF INVENTION

The following examples illustrate the invention without limiting the scope thereof. Parts of percentages are by weight unless otherwise stated.

The following abbreviations are used in the examples:

ACS . . . acrylc acid
AGE . . . allylglycidyl ether
B 180 . . . liquid polybutadiene oil (about 75% 1,4-cis-, about 24% 1,4-trans- and about 1%-vinyl double bonds; molecular weight about 1500±15%; iodine value about 450 g/100 g)
BPA . . . bisphenol A
BUT . . . n-butanol
CE . . . monoglycidylester of a $C_9$–$C_{11}$-KOCH-acid
DEAPA . . . N,N-diethylaminopropylamine
DGME . . . diethyleneglycoldimethylether
EHA . . . 2-ethylhexylamine
EHX . . . ethylhexanol
EPH I . . . diepoxy resin based on bisphenol A, epoxy equivalent weight about 190
HQ . . . hydroquinone
HMDA . . . hexamethylenediamine
HPA . . . hydroxypropylacrylate
MAA . . . maleic acid anhydride
EGL . . . ethyleneglycolmonoethylether
DPME . . . dipropyleneglycolmonomethylether
NPH . . . nonylphenol
PF 91 . . . paraformaldehyde, 91%
PH . . . phenol, 91% liquid form TDI ... toluylene diisocyanate (marketed isomer blend)
TEA ... triethylamine
PME ... propyleneglycolmonomethylether
Val ... Equivalent weight in grams for the designated functional group and, accordingly, is equivalent to 5 groups.

The following products are used in the examples as the base resin, Component A:

BH I: 190 parts EPH I (1 Val) are dissolved in 132 parts toluol in a reaction vessel equipped with thermometer, stirrer and reflux condenser, and heated to 60° C. A blend of 59 parts DEAPA (0.45 moles) and 59 parts EHA (0.45 moles) is slowly added, the reaction temperature being held at 75° to 80° C. with cooling as necessary. The temperature is held until the epoxy value has fallen to practically zero. The adduct solution obtained which is ready for further processing, calculated on resin solids, contains 0.8 moles NH-groups.

439 parts of the adduct (0.8 moles NH) are heated to 60° C., and, after addition of 182 parts BPA (0.8 moles) and 75.8 parts PF 91 (2.3 moles CH$_2$O) heated to 80° C. The raction temperture is held, while stirring, until the formaldehyde value has fallen to below 0.3% (calculated on the formaldehyde used). The reaction product has an amine value of 135 mg KOH/g.

BH II: As described in preparation BH I, a solution of 760 parts EPH I (4 Val) in 362 parts toluol is reacted with 260 parts DEAPA (2 moles) and 114 parts HMDA (2 moles). The product contains 4.0 moles NH-groups in 1134 g of resin solids.

1460 parts of this adduct solution (=1134 parts resin solids, containing 4.0 moles NH-groups) are, as described in preparation BH I, reacted at 60° C. with 346 parts pH (=315 parts phenol, 100%=3.5 moles=0.88 moles phenol/NH) and 231 parts PF 91 (=210 parts CH$_2$O, 100%=7 moles). The reaction product has an amine value of 203 mg KOH/g.

BH III: An adduct is prepared at 200° C. from 700 parts B 180 and 100 parts MAA in the presence of 0.05 parts diphenylparaphenylenediamine (inhibitor) in which the MAA has reacted completely. After cooling to 100° C., 130 parts EHX are added and the batch is esterified at 120° C. until the theoretical acid value is attained. This product is designated MAD A.

110 parts MAD A (corresponding to about 0.12 COOH-groups) are reacted with an 80% solution in DGME of 212 parts EPH I at 120° C., until an acid value of practically zero is attained. After addition of 108 parts DGME, 59 parts DEAPA (0.45 moles) and 59 parts EHA (0.45 moles), the batch is reacted at 65°-70° C. to an epoxy value of zero. When this value has been reached, 114 parts BPA (0.5 moles) and 50 parts PF 91 (1.5 moles) are added, and the batch is held at 60° C. until the content of free formaldehyde has fallen to from about 0.5-1%. The batch is diluted with 130 parts DGME.

BH IV: Analogous to preparation BH III, 199 parts MAD A (corresponding to about 0.21 COOH-groups) are reacted at 120° C. with 1102 parts EPH I, as an 80% solution in DGME, to an acid value of practically zero. After addition of 473 parts DGME, 116 parts HMDA and 442 parts DEAPA, the batch is reacted at 65° to 70° C. to an epoxy value of practically zero. After addition of 704 parts NPH, 251 parts BPA, 268 parts PF 91 (=244 parts CH$_2$O, 100%) and 490 parts DGME, the reaction is carried out at 60° to 65° C. until the content of free formaldehyde has fallen below 0.5 to 1%.

BH V: In a reaction vessel equipped with thermometer, stirrer and reflux condenser, 628 parts of the polybutadienemodified epoxy resin-amino adduct (corresponding to 0.8 moles NH-groups) produced according to preparation BH III are reacted at 60° C. with 114 parts BPA (0.5 moles), 149 parts MVP 1 (as prepared below; 80% solution, 0.2 moles), and 76 parts PF 91 (2.3 moles) until the content of free formaldehyde has fallen to 0.5 to 1% (calculated on the formaldehyde used). The batch is diluted with 170 parts PME and neutralized with 35 milliMoles formic acid per 100 g of resin solids. After homogenizing for one hour, 975 parts of deionized water are slowly added with vigorous stirring. The resulting dispersion has a solids content of about 35%.

Preparation of the Amino-Alkylated Nonylphenols (MVP) Used in Preparation BH V:

130 parts DEAPA and 440 parts NPH are heated to 70° C. in a reaction vessel equipped with receiver, cooler, thermometer and stirrer, and 66 parts PF 91 are added in portions. The temperature, due to the exothermic reaction, should not be allowed to surpass 80° C. The water forming is eliminated with the aid of a hydrocarbon entraining agent having a boiling range of 80° to 130° C. The reaction is carried out until the corresponding quantity of reaction water has formed. After vacuum-stripping the solvent, the product is diluted with DGME to a solids content of 80%.

BH VI: 1064 parts (5.6 Val) EPH I are dissolved with 694 parts DPME in a reaction vessel equipped with thermometer, stirrer and reflux condenser, and are reacted at 65° to 70° C. with 116 parts HDMA (1 mole), 364 parts DEAPA (2.8 moles), and 103 parts EHA (0.8 moles) until the epoxy value is zero. The adduct contains 5.6 moles of secondary NH-groups. After addition of a further 180 parts DPME, 550 parts NPH (2.5 moles), 84 parts of a 50% aqueous solution of urea (corresponding to 0.7 moles urea), 251 parts BPA (1.1 moles) and 254 parts PF 91 (7.7 moles) are added, and the batch is stirred at 60° C. until the content of free formaldehyde (calculated on the formaldehyde used) has fallen below 1%. A dispersion is prepared by neutralizing the batch with 272 parts of N-3 formic acid (corresponding to 30 milliMoles/100 g resin solids), and slowly diluting with deionized water to a solids content of 40%.

BH VII: In the apparatus described above, 760 parts EPH I (4.0 Val) are dissolved in 490 parts DPME and reacted with 116 parts HMDA (1 mole) and 260 parts DEAPA (2 moles) at 65° to 70° C. until the epoxy value is zero. The adduct contains four moles of secondary amino groups. After addition of a further 350 parts DPME, 594 parts NPH (2.7 moles) and 63 parts melamine (0.5 moles) are added, the batch is stirred at 55° to 60° C. until the content of free formaldehyde (calculated on the formaldehyde used) has fallen below 1%. After addition of 161 parts (corresponding to 25 milliMoles/100 g resin solids) of N-3 formic acid, a 35% dispersion is made according to the method described in preparation BH VI.

The following products are used in the examples as the modifier, Component B.

B 1: 700 parts B 180 are reacted at 200° C. with 100 parts MAA in the presence of 0.05 parts diphenylparaphenylenediamine (inhibitor) until the MAA has reacted completely. After cooling to 100° C., 74 parts BUT are added and the batch is esterified at 120° C. until the theoretical value of the semiester is reached. This product is designated MAD B. 874 parts MAD B are reacted at 120° C. with 250 parts CE to an acid value of below 3 mg KOH/g.

B 2: Linseed oil, paint quality.

B 3: Tung oil.

B 4: Trimethylolpropanetriacrylate (TMP).

B 5: An epxoy acrylate is prepared by reaction at 110° C. of 190 parts EPH I with 65 parts ACS in the presence of 0.2 parts TEA as catalyst and 3 parts HQ as inhibitor, to an acid value of below 4 mg KOH/g. The reaction product is dissolved with 45 parts of EGL to a solids content of 85%.

B 6: An unsaturated monoisocyanate is prepared from 174 parts TDI and 130 parts HPA in known manner. 608 parts of this product, after addition of 5 parts HQ and 407 parts DGME, are reacted at 75° to 80° with 118 parts TMP until the content of free isocyanate groups has fallen below 0.1%.

B 7: TMP-diallylether.

B 8: 73 parts n-butylamine are reacted with 228 parts AGE at 80°-90° C. to an epoxy value of practically zero. The product is dissolved with 75 parts EGL (solids content 75%).

EXAMPLES 1-11:

The base resins, Component A (BH I-BH VII), and the combination partners, Component B (B1-B8), are homogenized for one hour at 50°-70° C. in the weight ratio listed in Table I. The listed quantity of formic acid is added, and the blend is diluted by adding deionized water in portions to attain the listed solvent content.

TABLE I

| Example | Base Resin (100%) | Combination Partner (100%) | milliMoles Acid/100 g Resin Solids | % Solids Content of Dispersion |
|---|---|---|---|---|
| 1 | 85 BH I | 15 B 6 | 50 | 36 |
| 2 | 90 BH I | 10 B 3 | 50 | 38 |
| 3 | 80 BH II | 10 B 2 10 B 4 | 35 | 35 |
| 4 | 75 BH III | 25 B 5 | 35 | 40 |
| 5 | 85 BH III | 15 B 7 | 35 | 38 |
| 6 | 70 BH III | 20 B 1 10 B 4 | 40 | 36 |
| 7 | 90 BH IV | 10 B 8 | 30 | 40 |
| 8 | 85 BH IV | 15 B 5 | 35 | 36 |
| 9 | 80 BH V | 20 B 5 | 35 | 38 |
| 10 | 90 BH VI | 10 B 3 | 30 | 35 |
| 11 | 85 BH VII | 15 B 7 | 30 | 36 |

Table II lists the test results of paints based on Examples 1-11 as compared to paints containing Component A only as the binder (without a combination partner). Thus, column A shows the results obtained with unmodified binders, i.e., Component A only; and column B gives the results obtained with the combinations of the present invention, i.e., Component A mixed with Component B. The tests were carried out by depositing paints with the listed composition by cathodic electrodeposition (CED) method on degreased steel panels. All figures refer to resin solids. The paints had the following formulation:

75 parts resin combination of Examples 1-11
58 parts tinting paste (1)
0.075 parts cobalt metal as the naphthenate (1) The tinting paste consists of 100 parts mill base resin, 0.8 parts carbon black, 10 parts basic lead silicate, and 122.5 parts titanium dioxide. The mill base resin is prepared by dissolving 500 parts of an epoxy resin based on bisphenol A (epoxy equivalent weight about 500) in 214 parts PME and reacting the solution at 110° C. with 83 parts of a semiester of phthalic anhydride and EHX in the presence of 0.5 g of triethylamine as catalyst to an acid value of below 3 mg KOH/g. Then, 120 parts of an NH-functional oxazolidine prepared from aminoethylethanolamine, 2-ethylhexylacrylate and formaldehyde and 26 parts DEAPA are added, and the batch is reacted at 80° C. to an epoxy value of practically zero. The batch is diluted with 200 parts propyleneglycol monomethylether and partially neutralized with 97 parts of N-3 formic acid. The resulting solids content is 58.8%.

After dilution to a solids content of below 18%, the paints were cathodically deposited on zinc-phosphated steel panels under conditions such that a dry film thickness of 20±2 μm was obtained. The coatings were stoved for 30 minutes at the listed temperatures.

TABLE II

| | Stoving Temperature °C.* | | Film Quality** | | Erichsen Indentation (mm) DIN 53 156 | |
|---|---|---|---|---|---|---|
| Example | A | B | A | B | A | B |
| 1 | 160 | 150 | 3 | 1-2 | 2.1 | 4.7 |
| 2 | 160 | 160 | 3 | 1 | 2.1 | 6.8 |
| 3 | 140 | 140 | 2 | 1 | 3.3 | 5.5 |
| 4 | 160 | 150 | 2 | 1 | 4.1 | 7.3 |
| 5 | 160 | 160 | 2 | 1 | 3.1 | 4.5 |
| 6 | 160 | 160 | 2 | 1 | 4.1 | 8.0 |
| 7 | 160 | 160 | 2 | 1 | 3.2 | 5.7 |
| 8 | 160 | 150 | 2 | 1 | 3.2 | 7.1 |
| 9 | 160 | 150 | 2 | 1 | 4.3 | 7.8 |
| 10 | 160 | 150 | 2 | 1 | 2.6 | 5.2 |
| 11 | 160 | 150 | 3 | 1 | 2.3 | 6.1 |

*The stoving temperature was chosen in order that the coatings, on salt spray test according to ASTM B 117-64, after 700 hours of exposure show under-rusting at the crosshatch of less than 2 mm.
**Evaluation:
1 smooth surface
2 wavy surface
3 slightly rough surface As will be apparent to one skilled in the art, various modifications can be made within the scope of the aforesaid description. Such modifications being within the ability of one skilled in the art form a part of the present invention and are embraced by the appended claims.

It is claimed:

1. Process for producing cathodically depositable electrodeposition paint binders based on modified epoxy resins characterized in that-
   (A) 95 to 50% by weight of a reaction product obtained through reaction of
      an epoxy resin with at least two epoxy groups and having an epoxy equivalent weight of from about 180 to 1000 at from about 50° to 120° C. with
      0.6 to 1.0 moles of primary amino groups on a primary monoalkyl amine or a primary alkylene diamine or a primary-tertiary alkylene diamine per each available epoxy group and
      0 to 0.4 moles of a carboxylic compound or a secondary amine per each available epoxy group
   to provide an epoxy resin-amino adduct having an epoxy value of substantially zero, said epoxy resin-amino adduct thereafter being reacted at from about 50° to 90° C., calculated on one mole of NH-groups, with
0.5 to 1.0 moles phenol, and with
0.25 to 0.9 moles of formaldehyde per formaldehyde-reactive site, until the formaldehyde is substantially bound and the reaction product, upon partial or total neutralization with acids, is dilutable with water, is mixed with
(B) 5 to 50% by weight of an addition component which is substantially water-insoluble under the conditions of electrodeposition and compatible with the base resin Component A, said addition component being selected from the group consisting of
(a) drying oils with an iodine number of above 120;
(b) synthetic esters of the fatty acids with polyols;
(c) addition products of maleic anhydride to hydroxyfree drying oils with an iodine number above 120; synthetic esters of fatty acids with polyols; unsaturated hydrocarbon oligomers or polymers or copolymers with a molecular weight of from about 400 to 3000, the carboxy or anhydride groups of said maleic anhydride having been substantially completely transformed to ester, amide, or imide groups; and
(d) compounds carrying at least two (meth)acrylic or allyl double bonds,
the mixture, after being transformed to the water-dilutable salt by partial neutralization of the basic groups with inorganic or organic acids being dilutable with water.

2. The process according to claim 1 wherein in Component A the epoxy resin is based on bisphenol A or a phenol novolak.

3. The process according to claim 1 wherein in Component A the amine is a primary monoalkylamine with at least four carbon atoms.

4. The process according to claim 1 wherein in Component A the amine is a blend of monoalkylamine and a alkylene diamine.

5. The process according to claim 1 wherein in Component A the reaction of the epoxy groups with the amines is carried out at 50° to 90° C.

6. The process according to claim 1 wherein in Component A the reaction of the epoxy groups with the carboxylic compounds is carried out at from 90° to 120° C.

7. The process according to claim 6 wherein in Component A the carboxylic compound is a monocarboxylic acid with 7 to 20 carbon atoms.

8. The process according to claim 6 wherein in Component A the carboxylic compound is a semiester of a dicarboxylic acid with a monoalcohol or an oxazolidine compound.

9. The process according to claim 6 wherein in Component A the carboxylic compound is an addition product of maleic acid anhydride to unsaturated oils or hydroxy-free esters of fatty acids with polyols or low molecular weight unsaturated hydrocarbon polymers or oligomers, the anhydride groups of the maleic acid anhydride having been opened through semiester formation with monohydroxy compounds.

10. The process according to claim 9 wherein in Component A the carboxylic compounds have an acid value of from 30 to 130 mg KOH/g.

11. The process according to claim 9 wherein in Component A the number of carboxy groups of the semiesters is reduced through reaction with monoepoxy compounds.

12. The process according to claim 1 wherein in Component A the said phenol is a mono- or polynuclear phenol.

13. The process according to claim 12 wherein in Component A said mono- or polynuclear phenol is substituted with an alkyl group.

14. The process according to claim 1 wherein in Component A said phenol is an amino-alkylation product of a monosubstituted or dinuclear phenol.

15. The process according to claim 1 wherein in Component A a portion of said phenol is substituted with a formaldehyde-reactive compound.

16. The process according to claim 15 wherein in Component A said formaldehyde-reactive compound is urea, melamine, or guanamine.

17. The process according to claim 1 wherein in Component A 0.1 to 0.4 moles of the phenolic compound are replaced by formaldehyde-reactive compounds selected from the group of urea, thiourea, imidourea, melamine, acetoguanamine, benzoguanamine, and mixtures thereof.

18. The process according to claim 1 wherein an auxiliary organic solvent is utilized and, after neutralization with acids and dilution with water, said solvent is at least partly vacuum-stripped from the binder combination at from 30° to 60° C.

19. The process according to claim 1 wherein the binders are pigmented and pigmentation is effected with the aid of a pigmented mill base resin.

20. Cathodically depositable electrodeposition paint binders based on modified epoxy resins comprising a mixture of (A) 95 to 50% by weight of the reaction product at from about 50° to 120° C.

an epoxy resin with at least two epoxy groups and having an epoxy equivalent weight of from about 180 to 1000 with
0.6 to 1.0 moles of primary amino groups on a primary monoalkyl amine or a primary alkylene diamine or a primary-tertiary alkylene diamine per each available epoxy group and
0 to 0.4 moles of a carboxylic compound or a secondary amine per each available epoxy group
to provide an epoxy resin-amino adduct having an epoxy value of substantially zero, said epoxy resin-amino adduct thereafter being reacted at from about 50° to 90° C. per mole of NH-groups, with
0.5 to 1.0 moles phenol and
0.25 to 0.9 moles of formaldehyde per formaldehyde-reactive site to provide a product wherein said formaldehyde is substantially bound and said reaction product, upon partial or total neutralization with acids, is dilutable with water, and
(B) 5 to 50% by weight of an addition component which is substantially water-insoluble under the conditions of electrodeposition and compatible with the base resin Component A, said addition component being selected from the group consisting of
(a) drying oils with an iodine number of above 120;
(b) synthetic esters of the fatty acids with polyols;
(c) addition products of maleic anhydride to hydroxy-free drying oils with an iodine number above 120; synthetic esters of fatty acids with polyols; unsaturated hydrocarbon oligomers or polymers or copolymers with a molecular weight of from about 400 to 3000, the carboxy or anhydride groups of said maleic anhydride having been substantially completely transformed to ester, amide, or imide groups; and (d) compounds carrying at least two (meth)acrylic or allyl double bonds, the mixture, after being transformed to the water-dilutable salt by partial neutralization of the basic groups with inorganic or organic acids being dilutable with water.

21. The binder according to claim 20 wherein in Component A the said phenol is a mono- or polynuclear phenol.

22. The binder according to claim 20 wherein in Component A said mono- or polynuclear phenol is substituted with an alkyl group.

23. The binder according to claim 20 wherein in Component A said phenol is an amino-alkylation product of a monosubstituted or dinuclear phenol.

24. The binder according to claim 20 wherein in Component A a portion of said phenol is substituted with a formaldehyde-reactive compound.

25. The binder according to claim 20 wherein in Component A the epoxy resin is based on bisphenol A or a phenol novolak.

26. The binder according to claim 20 wherein in Component A the amine is a primary monoalkylamine with at least four carbon atoms.

27. The binder according to claim 20 wherein in Component A the amine is a blend of primary monoalkylamines and primary alkylene diamines.

28. The binder according to claim 20 wherein in Component A the carboxylic compound is a monocarboxylic acid which has from 7 to 20 carbon atoms.

29. The binder according to claim 28 wherein in Component A the carboxylic compound is an addition product of maleic acid anhydride to an unsaturated oil or the hydroxy-free esters of an oil fatty acid with a polyol or a low molecular weight unsaturated hydrocarbon polymer or oligomer, the anhyride groups of maleic acid having been opened through semiester formation with a monohydroxy compound.

* * * * *